(12) United States Patent
Jones et al.

(10) Patent No.: US 8,904,643 B2
(45) Date of Patent: Dec. 9, 2014

(54) VEHICLE SEAT FRAME AND METHOD

(75) Inventors: Matthew C. Jones, Portland, OR (US); Paul Brown, Grand Haven, MI (US)

(73) Assignee: Johnson Controls Technology Company, Holland, MI (US)

( * ) Notice: Subject to any disclaimer, the term of this patent is extended or adjusted under 35 U.S.C. 154(b) by 79 days.

(21) Appl. No.: 13/238,183

(22) Filed: Sep. 21, 2011

(65) Prior Publication Data

US 2012/0005874 A1   Jan. 12, 2012

Related U.S. Application Data

(62) Division of application No. 12/302,624, filed as application No. PCT/US2006/021365 on Jun. 2, 2006.

(51) Int. Cl.
*B23P 11/00* (2006.01)
*B60N 2/68* (2006.01)
*B60N 2/18* (2006.01)

(52) U.S. Cl.
CPC .............. *B60N 2/1803* (2013.01); *B60N 2/682* (2013.01); *B23P 11/005* (2013.01); *B60N 2/181* (2013.01)
USPC .......................................... 29/897.2; 29/507

(58) Field of Classification Search
CPC ...... B23P 11/005; B21D 31/04; B21D 29/08; B21D 29/20; B21D 41/02; B21D 41/025; B21D 39/08; B21D 39/20
USPC .............. 29/897, 897.2, 897.312, 897.3, 437, 29/445, 507; 297/452.18, 216.1
See application file for complete search history.

(56) References Cited

U.S. PATENT DOCUMENTS

| | | | |
|---|---|---|---|
| 2,152,712 A * | 4/1939 | Stevens .......................... | 173/132 |
| 2,999,529 A | 9/1961 | Wlodzimierz | |
| 4,218,092 A | 8/1980 | Schach et al. | |
| 5,156,439 A | 10/1992 | Idlani et al. | |
| 5,713,611 A | 2/1998 | Kurimoto et al. | |
| 6,779,841 B2 | 8/2004 | Eckendorff | |
| 6,836,951 B2 * | 1/2005 | Dudash et al. .................. | 29/505 |
| 2001/0035673 A1 * | 11/2001 | Lepaule ........................ | 297/338 |
| 2004/0111864 A1 * | 6/2004 | Skinner et al. .................. | 29/523 |

FOREIGN PATENT DOCUMENTS

| | | |
|---|---|---|
| FR | 2772317 A | 6/1999 |
| FR | 2806675 A1 | 9/2001 |
| FR | 2831228 A1 | 4/2003 |

(Continued)

OTHER PUBLICATIONS

CN First Office Action dated Aug. 23, 2010 as received in corresponding Chinese Application No. 200680055446.8 and its English equivalent.

(Continued)

*Primary Examiner* — Christopher Besler
(74) *Attorney, Agent, or Firm* — Foley & Lardner LLP (57) ABSTRACT

A vehicle seat frame provides a tilting feature for tilting the seat cushion. The frame includes side brackets (20) with a torsion tube (60) laterally-extending through an aperture (100) of the side brackets. The torsion tube is fitted against the side bracket through an internal swaging procedure to allow smooth rotation of the torsion tube within the side brackets. The torsion tube includes an annular protrusion (200) which provides an axial locking feature that tightly secures the subcomponents placed onto the torsion tube during vehicle operation.

18 Claims, 5 Drawing Sheets

(56) References Cited

FOREIGN PATENT DOCUMENTS

| GB | 2 122 928 A | 1/1984 |
|---|---|---|
| JP | 1997-079033 A | 3/1997 |
| JP | 2006-098115 A | 4/2006 |
| WO | WO-97/46413 A | 12/1997 |

OTHER PUBLICATIONS

International Search Report dated Feb. 5, 2007 as received in corresponding PCT Application No. PCT/US2006/021365.

US Office Action dated Mar. 23, 2011 as received in corresponding U.S. Appl. No. 12/302,624.
Japanese Office Action dated Jan. 10, 2012 as received in corresponding Japanese Application No. 2009-513115, 2 pages.
English translation of FR 2772317, 2 pages.
US Office Action dated Nov. 30, 2011 as received in corresponding U.S. Appl. No. 12/302,624.
US Notice of Allowance on received in connection with U.S. Appl. No. 12/302,624 DTD Dec. 6, 2012.
US Office Action dated Jun. 5, 2012 as received in corresponding U.S. Appl. No. 12/302,624, 10 pages.

* cited by examiner

Fig. 10

VEHICLE SEAT FRAME AND METHOD

CROSS REFERENCE TO RELATED APPLICATIONS

This application is a divisional application of U.S. patent application Ser. No. 12/302,624, filed Nov. 26, 2008 which is a National Stage application of International Application No. PCT/US2006/021365, filed on Jun. 2, 2006. The entire contents of the aforementioned applications are incorporated by reference herein in their entirety.

BACKGROUND

The present invention relates generally to the field of vehicle seating, more specifically, vehicle seat frame assemblies with front and rear tilting capabilities as well as a method for manufacturing the same.

Vehicle seat frame assemblies typically include a seat (having a seat bottom or cushion and a seat back) and may include seat adjusters that alter the position of the seat frame. Seat adjusters are used for many purposes, such as on a captain's seat to provide selective horizontal fore and aft movement of the seat, vertical movement of the seat, and/or pivotal movement of the seat back, as is well known. The ability to adjust the position of the seat is desirable to enable vehicle occupants of various sizes to be comfortably and properly seated within the vehicle.

Vehicle seat brackets and tracks include adjuster systems for frontward/rearward tilting of the seat cushion frame. Such features may be manually or automatically operable. The seat track includes a torque (or torsion) tube extending between side brackets (or "B-brackets") of the seat frame. The torsion tube includes a shank portion located between the side brackets and typically subjacent the cushion on the seat bottom. The torsion tube includes a head portion at each end coupled to a side bracket on each side of the seat frame along with a bell crank or pivot linkage. The pivot linkage is coupled to the horizontal adjustment rails or a floor bracket mounted thereto. An actuator selectively rotates the pivot linkages. For example, in some arrangements, rotation of the front pivot linkages in one direction moves the front portion of the seat upward; rotation of the rear pivot linkages in the opposite direction moves the rear portion of the seat upward with respect to the vehicle floor. Some automatic seat adjuster systems utilize a powered drive mechanism (typically an electric motor) in conjunction with a system of gears and other components to adjust the seat cushion. For example, it is known to use a motor-driven threaded screw attached to the pivot linkage to selectively lift and lower the seat cushion.

It is further known to have the torsion tube coupled to the side bracket through a swaging process employing a ram forming technique commonly referred to as "column loading" in the axial direction of the tube. A mandrel or die is forced into the head portion of the torsion tube at a predetermined pressure level to reduce clearances between the side bracket and the torsion tube. The die defines an outer diameter that is smaller at the front end than the rearward portion of the die. The die forces the end of the head portion of the torsion tube to flare outward, thereby radially and axially restricting the side bracket from moving beyond the head portion of the torsion tube. However, this process can be imprecise as it is difficult to control the extent of flaring and depth of axial deformation resulting from column loading. It is also know to utilize a Belleville washer, or other axially adjustable washer or device, to accommodate the variable axial clearance (or lateral looseness) between the flared portion of the tube and the side bracket. However, Belleville washers increase the overall cost and complexity of the vehicle seat frame assembly.

The integrity of the fit between the side bracket and the torsion tube influences user comfort, seat stability, BSR (buzz-squeak-rattle) values and longevity. A loose fitting between the side bracket and torsion tube can lead to deflection in the other parts of the seat assembly. For example, one original equipment manufacturing test involves measuring the deflection of the seat back with respect to the vehicle floor during simulated normal highway driving conditions. Excessive deflection of the seat back is indicative of a vehicle seat assembly having lower "stability values." When the connection between the torsion tube and the side bracket has substantial axial and/or radial spacing between each element, the seat stability values are high (indicating high deflection in the seat frame assembly) and the user may experience more vibration in the seat back and other portions of the seat.

Figure 1:
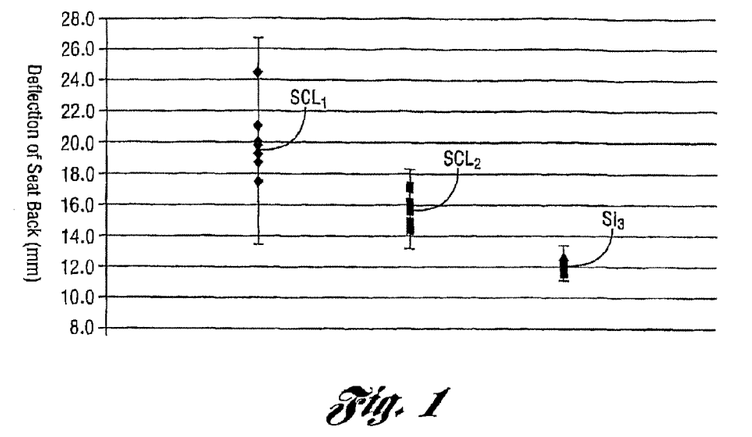
FIG. 1 is a stability measurements chart for torsion tubes alternatively swaged.

To improve the connection of the side bracket and torsion tube some seat manufacturing techniques use multiple iterations of axial or column loading. Multiple iterations may reduce deflection of the seat back and increase the stability of the seat assembly. However, such additional steps increase manufacturing time and costs of the vehicle seat frame. Moreover, column loading may produce less precise results and yield more broadly ranging deflection values (e.g. $S_{CL1}$, charting the stability values for a seat after one iteration of axial loading, and $S_{CL2}$, charting the stability values for a seat after multiple iterations of axial loading, as shown in FIG. 1).

One drawback of multiple iteration column loading is that when simultaneously performed on each side of the torsion tube, the mid-section of the torsion tube undergoes compressive stresses which cause the tube to deform or possibly buckle. Such deformation may cause the tube to exceed predetermined dimensional tolerances.

One alternative arrangement utilizes arc welding to affix a torsion tube to the side brackets and incorporates a rotatable insert in the torsion tube. However, welding can alter the strength of the workpiece and this design is costly due to processing times and additional part requirements.

It remains desirable to provide a vehicle seat frame assembly having a seat cushion adjusting feature with a torsion tube coupled to the seat frame utilizing more cost efficient manufacturing techniques which provide greater design and manufacturing flexibility while providing increased seat stability and durability.

SUMMARY

In one exemplary embodiment, a vehicle seat frame assembly includes a side bracket having at least one extruded aperture extending there through; and a torsion tube extendable through the aperture of the side bracket and extendable through an aperture in the linkage. The linkage is configured to pivotably couple to the torsion tube. The torsion tube includes a head portion at an end of the torsion tube and a shank portion in the middle of the torsion tube. A bushing is coaxially aligned on the torsion tube between the torsion tube and the side bracket. The torsion tube and bushing are fitted onto the side bracket through an internal swaging (or diametric expansion) procedure. The extruded aperture of the side bracket includes an annular lip portion proximate the head portion. A washer is located on the tube adjacent the side bracket.

In one exemplary embodiment, a vehicle seat assembly with frame includes a side bracket having at least one extruded aperture; a floor bracket indirectly coupled to the side bracket; and a linkage configured to pivotably couple the side bracket to the floor bracket. The linkage includes an aperture. Further provided is a torsion tube extendable through the aperture of the side bracket and extendable through the aperture of the linkage. The torsion tube includes a head portion and a shank portion. A bushing is radially aligned between the torsion tube and the side bracket. The torsion tube and bushing are fitted onto the side bracket through an internal swaging procedure. The torsion tube includes an annular lip portion on the head portion. The lip portion defines an inner diameter and the inner diameter of the lip portion is constant.

In another exemplary embodiment, a method of manufacturing a torsion tube of the type used in a vehicle seat frame assembly including a floor bracket, a pivotable linkage, and at least one side bracket coupled to the floor bracket via the pivot linkage comprises: forming a generally cylindrical aperture in the pivot linkage; forming a generally cylindrical aperture in the side bracket; forming a torsion tube having a shank portion and a first and second head portion; inserting the torsion tube through an aperture in the side bracket and the pivot linkage; placing a bushing onto a first head portion of the torsion tube; and internally swaging the first head portion of the torsion tube radially outwardly.

In another exemplary embodiment, a vehicle seat frame assembly includes: a torsion tube having an inner diameter and an outer diameter. The torque tube further has a terminal end, a head portion extending from the terminal end and a shank portion distal from the head portion. The head portion of the tube has a substantially constant inner and outer diameter. A linkage member is connected to the torque tube along the head portion, the linkage member is configured to rotate with the torque tube for adjusting the vehicle seat frame. A seat bracket has a hole therein, the head portion of the tube extending through the hole and the terminal end of the torque tube being on a first side of the seat bracket. A bushing having an inner diameter greater than the outer diameter of the torque tube is also provided. The bushing is positioned on the torque tube and located between the linkage member and the side bracket. The torque tube has an expanded diameter portion located between the terminal end of the torque tube and the seat bracket and the expanded diameter portion of the torque tube axially locks the side bracket and the bushing against the linkage member.

In another exemplary embodiment, a vehicle seat frame assembly includes: a seat bracket having an extruded aperture defining an annular member having an inner diameter and an outer diameter. A torque tube has an inner diameter and an outer diameter, the torque tube further has a terminal end, a head portion extending from the terminal end and a shank portion distal from the head portion. The head portion of the tube has a substantially constant inner and outer diameter. The head portion of the tube extends through the aperture in the seat bracket and the terminal end of the torque tube is located on a first side of the seat bracket. A linkage member is connected to the torque tube along the head portion. The linkage member is configured to rotate with the torque tube for adjusting the vehicle seat frame. A bushing having an inner diameter greater than the outer diameter of the torque tube is also provide. The bushing is positioned on the torque tube and located between the linkage member and the side bracket. A washer having an inner diameter greater than the outer diameter of the torque tube is further provided. The washer is positioned on the torque tube and located on the first side of the side bracket. The torque tube has an expanded diameter portion located between the terminal end of the torque tube and the washer and the expanded diameter portion of the torque tube axially locks the washer, the seat bracket and the bushing against the linkage member.

In another exemplary embodiment, a vehicle seat frame assembly includes: a side bracket having an extruded aperture defining an annular member having an inner diameter and an outer diameter. A torque tube has an inner diameter and an outer diameter, the torque tube further has a terminal end, a head portion extending from the terminal end and a shank portion distal from the head portion. The head portion of the tube has a substantially constant inner and outer diameter. The head portion of the torque tube extends through the hole in the side bracket and the terminal end of the torque tube is located on a first side of the seat bracket. A linkage member is connected to the torque tube along the head portion, the linkage member configured to rotate with the torque tube for adjusting the vehicle seat frame. A bushing having a first portion having a first inner diameter greater than the outer diameter of the torque tube is also provided. The bushing has a second portion having a second inner diameter greater than the outer diameter of the annular member of the side bracket. The bushing is positioned on the torque tube and located between the linkage member and the side bracket and the annular member of the side bracket is at least partially received in the second portion of the bushing. The torque tube has an expanded diameter portion located between the terminal end of the torque tube and the side bracket and the expanded diameter portion of the torque tube axially locks the side bracket and the bushing against the linkage member.

DETAILED DESCRIPTION

Referring to the FIGs and particularly to FIGS. 2-7, a vehicle seat frame assembly 10 for use in an automobile (not shown) or other transportation device having occupant seating is illustrated. The vehicle seat frame assembly 10 is configured to tilt the entire assembly upward at its rear and front ends. The vehicle seat frame assembly 10 includes a pair of side brackets 20 (or B-brackets) configured to support a seat cushion of the seat frame assembly 10. A seat track adjuster 50 and floor brackets 30 are provided for connecting the vehicle seat frame assembly 10 to the vehicle.

The vehicle seat assembly 10 includes in-board and outboard pivot linkages 40 coupled to fore and aft torsion tubes 60 and configured to rotate with respect to floor (or support) brackets 30. The pivot linkages 40 may be manually driven or the may be power driven by an adjuster having an electric motor for automatic control of the pivot linkages 40.

A set of pivot linkages 40 are encompassed in the front end of the seat frame 10 and a set of pivot linkages 40 are encompassed in the rear end 70 of the seat frame 10. Pivot linkages 40 act as a lever (or bell crank) for lifting or tilting the rear and front portions of the seat assembly 10 with respect to the vehicle floor. In the illustrated embodiment, rotation of the front pivot linkages 40 counter-clockwise with respect to the vehicle floor will raise the front end of the seat cushion, while rotation of the rearward pivot linkages counter-clockwise raises the rear end of the seat cushion. The pivot linkages 40 are configured to tilt the seat assembly 10 between 0 and 45 degrees with respect to the vertical axis perpendicular to the vehicle floor.

Pivot linkages 40 are coupled to the torsion tube 60 laterally extending between each side bracket 20. In one embodiment, the torsion tube 60 extends through an aperture 130 in the pivot linkage 40 and is preferably arc welded thereto. The torsion tube 60 may be affixed to the pivot linkages using any known or appropriate connection within the field. The tube 60 includes a shank portion 80 and two end portions each defining a head portion 90. The tube 60 may alternatively by contoured to provide a moment and to accommodate the profile of the vehicle floor and the seat cushion. The head portion 90 of the tube 60 is configured to fit through an extruded aperture 100 in the side bracket 20. The torsion tube 60 is rotatably coupled to the side bracket 20. A bushing 120 is placed onto the torsion tube 60 and supports rotation of the torsion tube 60 with respect to the side bracket 20. In one embodiment, the torsion tube 60 is composed of steel or other metallic alloy.

The head portion 90 of the torsion tube 60 includes a lip portion 150. In order to accomplish this, the torsion tube 60 is swaged at both ends. In the illustrated exemplary embodiments, the lip portion 150 is substantially annular having an inner diameter unlike the flared lip at the head portion of the prior art designs. The extendable portions 180 of the swaging tool 160 produce more consistent results by managing the mandrel stroke rather than the pressure setting as in column loading.

Figure 2:
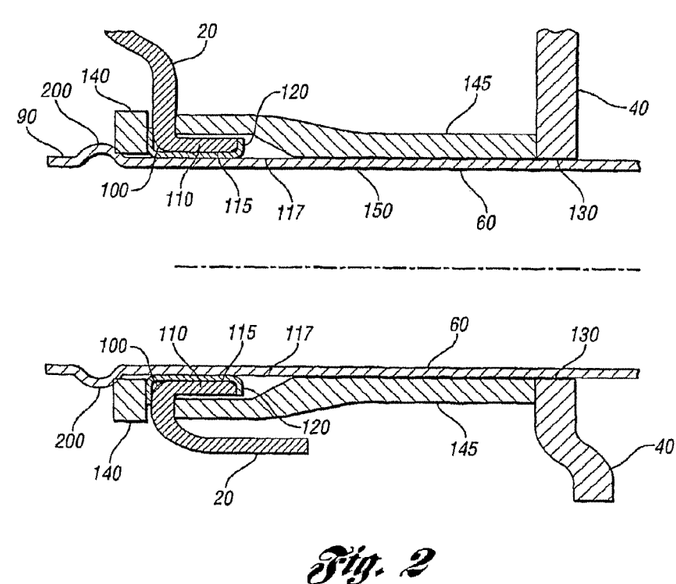
FIG. 2 is a partial schematic cross-sectional view of a vehicle seat frame assembly with tube having annular beading according to one exemplary embodiment.
Figure 3:
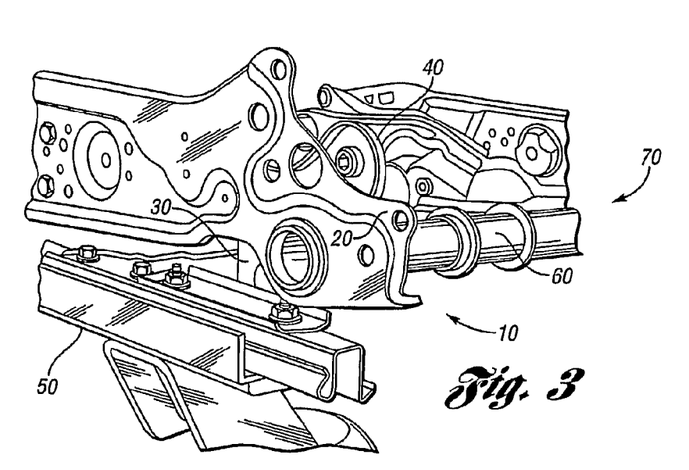
FIG. 3 is a digital image of a vehicle seat frame assembly according to an exemplary embodiment.
Figure 4:
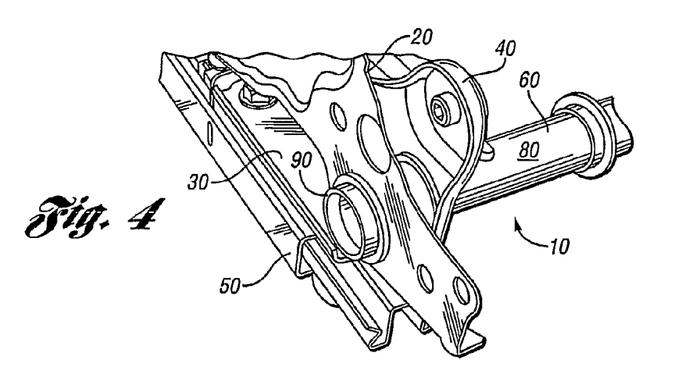
FIG. 4 is a digital image of a vehicle seat frame assembly according to an exemplary embodiment.
Figure 5:
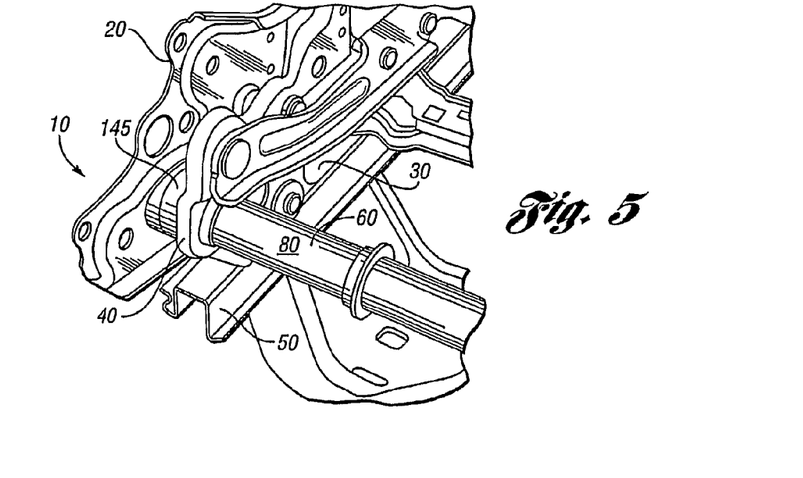
FIG. 5 is a digital image of a vehicle seat frame assembly according to an exemplary embodiment.
Figure 6:
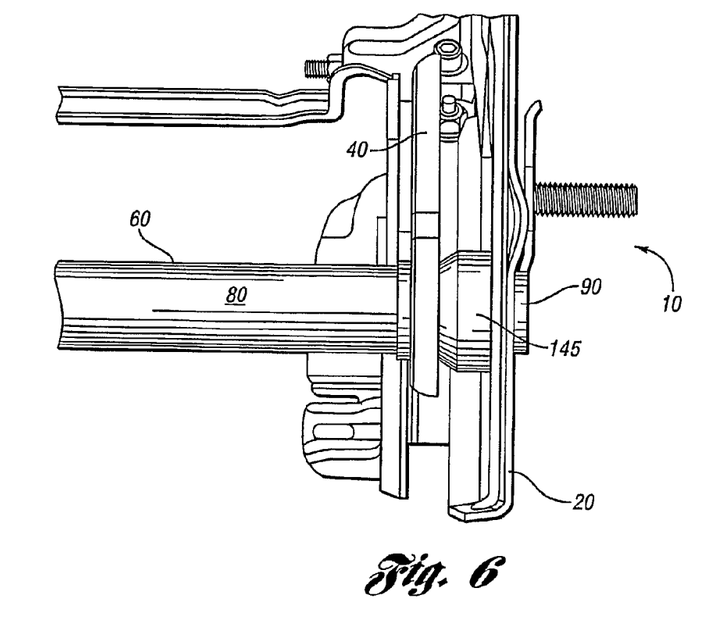
FIG. 6 is a digital image of a vehicle seat frame assembly according to an exemplary embodiment.
Figure 7:
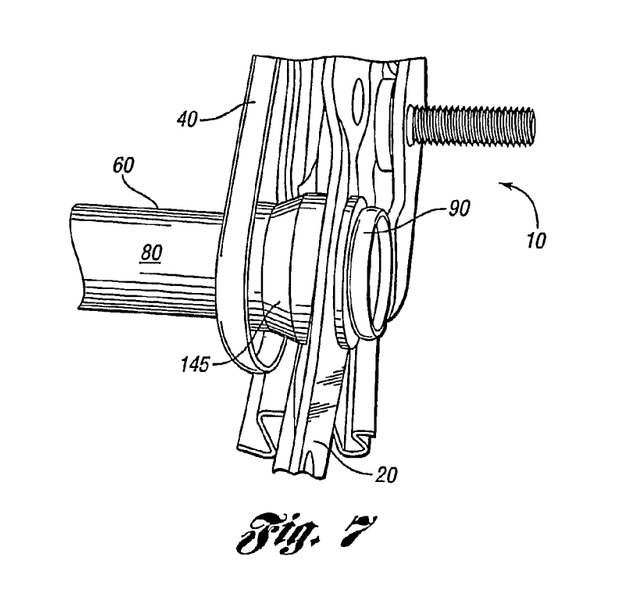
FIG. 7 is a digital image of a vehicle seat frame assembly according to an exemplary embodiment.

The aperture 100 in the side bracket 20 is preferably manufactured via an extrusion process. The extrusion process leaves a substantial free-edge or annular member 110 defining an inner diameter 115 configured to interface the outer diameter 117 of the torsion tube 60. With increased contact surface between the inner diameter 115 of the side bracket 20 and the outer diameter 117 of the torsion tube 60, the bushing 120 and/or torsion tube 60 may interface with the annular member 110 of the side bracket 20 (as shown in FIG. 2). In one embodiment, an extruded hole clearance of greater than 0.25 mm is provided for enabling manual insertion of the torsion tube 60 into the aperture 100 in the side bracket 20.

In one exemplary embodiment, the components of the vehicle seat frame assembly 10 (including the side brackets 20, torsion tube 60, pivot linkages 40, floor brackets 30, and washer(s) 140) are composed of a metal alloy (e.g., steel). A bushing 145 (or spacer) may be placed onto the torsion tube 60 between the pivot linkage 40 and side bracket 20. The bushing 120 may be a Norton bushing having a Teflon® coated portion radially adjacent the outside diameter 117 of the torsion tube 60 for smooth rotation. The expansion of the bid 160 reduces clearances between the torsion tube 60 to the bushing 120.

In one exemplary embodiment, a washer 140 is provided concentric with the head portion 90 of the torsion tube 60 and the side bracket 20. The washer 140 provides a more secure fit—axially—between the head portion 90 of the torsion tube 60 to the side bracket 20. The washer 140 is assembled or placed onto the head portion 90 of the torsion tube 60 prior to swaging.

Figure 8:
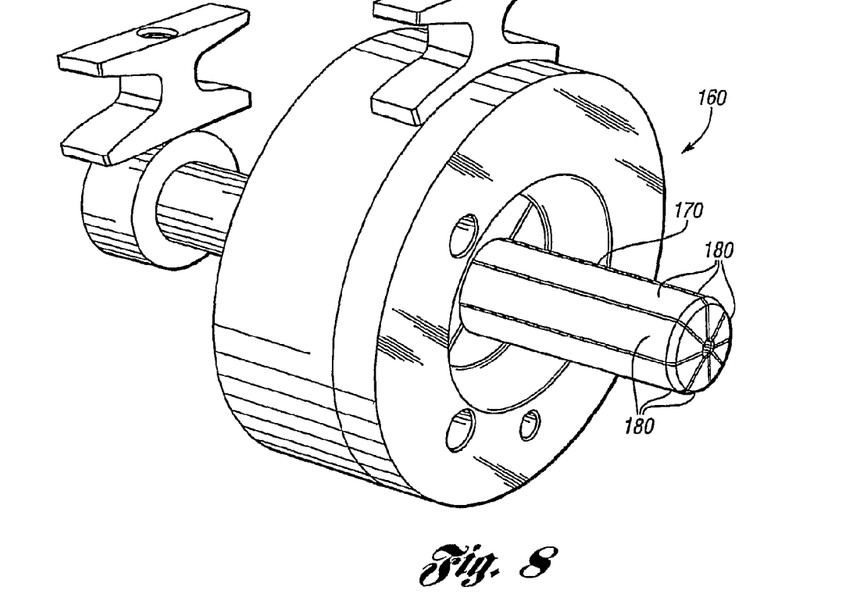
FIG. 8 is a schematically depicted perspective view of a swaging tool with expandable die according to an exemplary embodiment.
Figure 9:
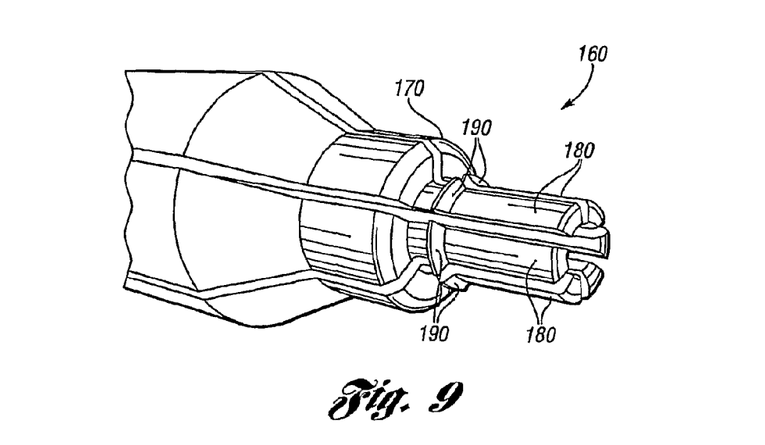
FIG. 9 is a partial schematic perspective view of a swaging tool with expandable die having a protrusion for radial beading in a vehicle seat frame assembly according to an exemplary embodiment.

A swaging tool 160, as shown in the illustrated exemplary embodiment of FIG. 8, includes a die portion 170 (or mandrel) configured with extendable portions 180 (or "fingers") that extend radially outward. The swaging operation is performed after the torsion tube 60 has been inserted into the side brackets 20. When expanded, the swaging tool 160 has a larger outer diameter than the original inner diameter of the torsion tube 60. The die portion 170 applies pressure to the inner diameter of the torsion tube 60 at the head portion 90. In the illustrated embodiment, the die portion 170 includes six extendable portions 180 (or fingers). The extendable portions 180 may be pneumatically or hydraulically controlled and/or motor driven by a servo motor. In the illustrated embodiment of FIG. 8, extendable portions 180 of the die comprise a smooth exterior surface so that the inner diameter of the torsion tube 60 may be substantially uniformly expanded during swaging. In the illustrated embodiment of FIG. 9, the extendable portions 180 of the die 170 are each configured with a semi-annular, radially-extending protrusion 190. The semi-annular protrusions 190 form an annular protrusion 200, (or bead) on the outer surface of the torsion tube 60 (as shown in FIG. 2-7). The protrusion 200 is designed to interface with the washer 140 on a side of the side bracket 20. This interface creates axial loading that traps the washer 140 against the side bracket 20 and bushings 120, 145 thereby axially (or laterally) locking the assembly against the pivot linkage 40 or other feature on the torsion tube 60.

The annular protrusion 200 along with the annular member 110 overlapped by the bushing 145, reduce deflection of the seat assembly 10 as the annular protrusion 200 traps the washer 140 against the bushing 120 and side bracket 20 thereby axially and radially locking the assembly. The stability values, $S_{is}$, for the exemplary embodiment as illustrated in FIG. 1, indicate that the deflection of the seat assembly 10 is substantially improved by the usage of internal swaging. FIG. 1 charts the measured deflection at the top of a seat assembly 10 for several variously swaged seats tested under normal highway driving conditions. Only one iteration of the internal swaging was performed in the exemplary embodiment which improved the stability of the vehicle seat frame assembly 10 to an extent greater than multiple iterations of column loading, (the $S_{CL2}$ values as represented in FIG. 1). The internal swaging operation decreased the number of iterations (and overall steps) required to affix the torsion tube 60 to the side bracket 20 and improved the stability performance of the vehicle seat assembly 10. Less deflection in the seat assembly 10 also reduces joint degradation over the life cycle of the vehicle seat assembly 10. Therefore, a more secure fit leads to a longer life cycle (i.e., a more durable assembly) and better performance during the duration of usage.

One exemplary method of producing a seat frame assembly 10 includes having an internal swaging operation that is fully automated on an indexing pallet line. At each station, the head portions 90 of a torsion tube 60 are simultaneously internally swaged at each head portion. The swaging tool 160 may be configured for use with a plurality of differently sized torsion tubes 60 onto various sized side brackets 20. Moreover, the die portion 170 may be interchanged to form tubes of various sizes. Therefore, the internal swaging operation also supports a flexible manufacturing environment and can be performed for seat frame assemblies for a wide range of vehicles including cars, SUVs, trucks, minivans, airplanes, buses, trains, boats motorcycles, and any other passenger vehicle.

Figure 10:
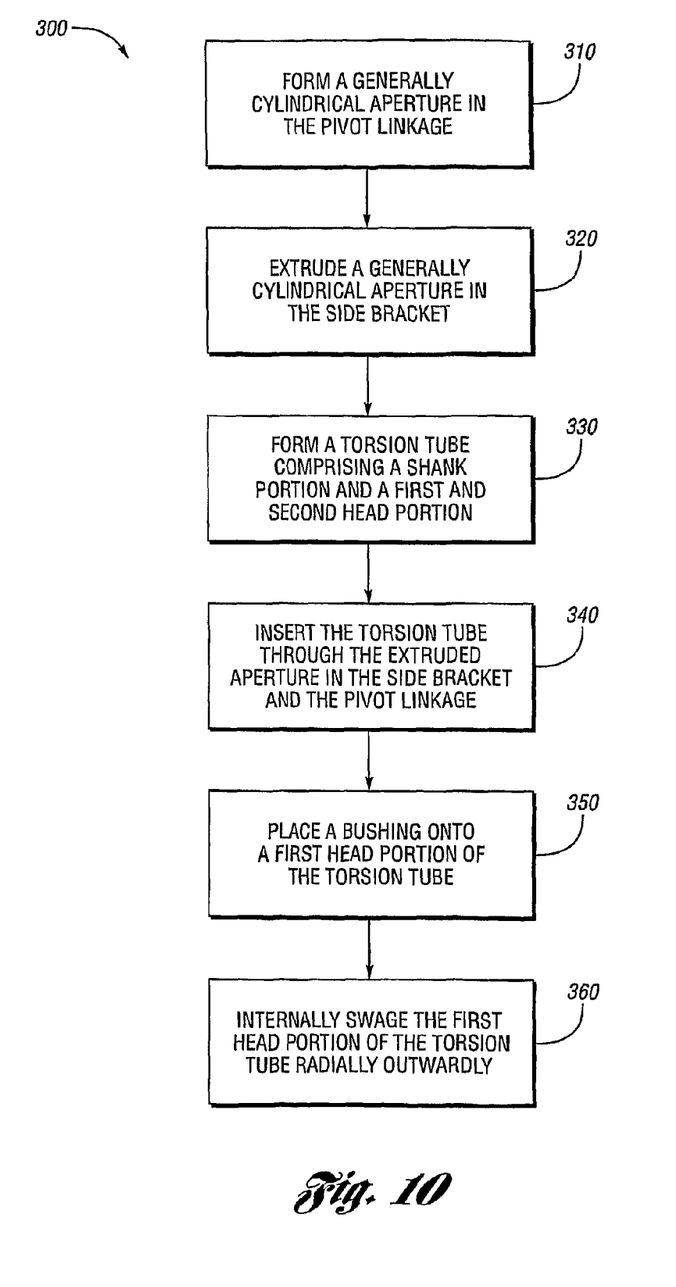
FIG. 10 is a flow diagram of a method of manufacturing a vehicle seat having a torsion tube internally swage locked to a side bracket according to an exemplary embodiment.

A method 300 of manufacturing a torsion tube 60 of the type used in a vehicle seat frame assembly 10 including a floor bracket 30, a pivotable linkage 40, and at least one side bracket 20 is provided (as shown in FIG. 10). The method includes forming an aperture in the pivot linkage 310; forming a generally cylindrical aperture in the side bracket 320; forming a torsion tube comprising a shank portion and a first and second head portions 330; inserting the torsion tube through the aperture in the side bracket and fixing the pivot linkage 340 thereto; placing a bushing onto a first head portion of the torsion tube 350; and internally swaging the first head portion of the torsion tube radially outwardly 360. The method may further include internally swaging a second head portion on the torsion tube radially outwardly. In one embodiment, the internal swaging of a second head portion on the torsion tube is performed simultaneously with the internal swaging of a head portion of the torsion tube. In another embodiment, the internal swaging of the second head portion on the torsion tube is performed sequentially with the internal swaging of the head portion of the torsion tube. The tube is preferably internally swaged at the first head portion of the torsion tube to include an annular protrusion extending from an outer surface of the torsion tube. In one embodiment, the generally cylindrical aperture in the side bracket is formed through an extrusion process to include an annular member. Insertion of the torsion tube in the side bracket occurs prior to the internal swaging of the first head portion. In another embodiment the method includes placing a washer onto the first head portion of the torsion tube prior to internally swaging the first head portion.

It should also be noted that the seat adjuster systems and methods disclosed herein can be used in a variety of vehicle seat systems (e.g., front seats including both a driver's seat or a passenger's seat, second or third row seats, bucket seats, bench seats, etc.) for automobiles such as cars, trucks, SUVs, minivans, buses, and the like; airplanes, boats, etc. and other non-vehicle seat applications wherein it would be desirable to tilt the seat. It should further being noted that while the inventions will be described in detail herein with reference to a vertical lift system of a seat adjuster system, the inventions may be equally applicable for use with any other portion of a seat adjuster system (e.g., horizontal drive systems, angular displacement systems, etc.). All such variations are intended to be within the scope of the inventions.

While the exemplary embodiments illustrated in the FIGs and described above are presently preferred, it should be understood that these embodiments are offered by way of example only. For example, the teachings herein can be applied to any seat frame assembly and are not limited to vehicle seat frames. Accordingly, the present seat frame assembly is not limited to a particular embodiment but extends to various modifications that nevertheless fall within the scope of the appended claims.

What is claimed is:

1. A method of manufacturing a vehicle seat frame assembly, wherein a pivot linkage has a first generally cylindrical aperture, at least one side bracket has a second generally cylindrical aperture having an aperture diameter, the at least one side bracket is configured to be coupled to a floor bracket via the pivot linkage, and a torsion tube comprises a shank portion, a first head portion, and a second head portion, comprising:

disposing a bushing on an inner circumferential surface of the second generally cylindrical aperture of the at least one side bracket;

inserting the first head portion of the torsion tube through the first generally cylindrical aperture in the pivot linkage and the second generally cylindrical aperture in the side bracket such that the bushing surrounds the first head portion and is disposed between an outer circumferential surface of the first head portion and the inner circumferential surface of the second generally cylindrical aperture in a radial direction; and internally swaging the first head portion of the torsion tube radially outwardly such that the first head portion of the torsion tube is expanded so as to have an enlarged constant inner diameter that spans an entire length of the second generally cylindrical aperture of the side bracket, wherein an outer diameter of the torsion tube spanning an entire length between the side bracket and the pivot linkage is smaller than the aperture diameter of the second generally cylindrical aperture, wherein the step of internally swaging the first head portion of the torsion tube comprises forming an annular protrusion extending from an outer surface of the torsion tube such that the side bracket is disposed between the annular protrusion and the pivot linkage, and wherein the annular protrusion has an outer diameter that is larger than outer diameters of the torsion tube extending from both sides of the annular protrusion in an axial direction of the torsion tube.

2. The method of claim 1, wherein the second generally cylindrical aperture in the side bracket is formed through an extrusion process such that an annular member extending from a flat surface of the side bracket toward the pivot linkage is formed.

3. The method of claim 1, further comprising:

internally swaging the second head portion on the torsion tube radially outwardly.

4. The method of claim 3, wherein the internal swaging of the second head portion on the torsion tube is performed simultaneously with the internal swaging of the first head portion of the torsion tube.

5. The method of claim 1, wherein the inserting the torsion tube in the side bracket occurs prior to the internal swaging of the first head portion.

6. The method of claim 1, further comprising:

placing a washer onto the first head portion of the torsion tube prior to internally swaging the first head portion such that the side bracket is axially disposed between the washer and the pivot linkage.

7. The method of claim 1, wherein the annular protrusion formed in the first head portion of the torsion tube axially secures a spacer and the side bracket against the pivot linkage, and wherein the spacer surrounds the torsion tube in a circumferential direction.

8. The method of claim 1, further comprising:

placing a spacer on the torsion tube and located between the pivot linkage and a first side of the side bracket, wherein the spacer surrounds the torsion tube in a circumferential direction; and placing a washer having an inner diameter greater than an outer diameter of the torsion tube on the torsion tube and located on a second side of the side bracket opposite to the first side of the side bracket, wherein the annular protrusion of the torsion tube axially locks the washer, the side bracket and the spacer against the pivot linkage.

9. A method of manufacturing a vehicle seat frame assembly, comprising:

inserting a first head portion of a torsion tube through a second generally cylindrical aperture in a side bracket and through a first generally cylindrical aperture in a pivot linkage, wherein the side bracket is configured to be coupled to a floor bracket via the pivot linkage, wherein the torsion tube comprises a shank portion between the first head portion and a second head portion, wherein second generally cylindrical aperture has an aperture diameter; and internally swaging the first head portion of the torsion tube radially outwardly such that the first head portion of the torsion tube is expanded so as to have an enlarged constant inner diameter that spans an entire length of the second generally cylindrical aperture of the side bracket, wherein an outer diameter of the torsion tube spanning an entire length between the side bracket and the pivot linkage is smaller than the aperture diameter of the second generally cylindrical aperture, and wherein the second generally cylindrical aperture in the side bracket is formed through an extrusion process such that an annular member extending from a flat surface of the side bracket toward the pivot linkage is formed, wherein the step of internally swaging the first head portion of the torsion tube comprises forming an annular protrusion extending from an outer surface of the torsion tube, and wherein the annular protrusion has an outer diameter that is larger than outer diameters of the torsion tube extending from both sides of the annular protrusion in an axial direction of the torsion tube.

10. The method of claim 9, further comprising:

securing a bushing onto the first head portion of the torsion tube such that the bushing surrounds the first head portion in a circumferential direction.

11. The method of claim 9, further comprising:

internally swaging the second head portion on the torsion tube radially outwardly.

12. The method of claim 11, wherein the internal swaging of the second head portion on the torsion tube is performed simultaneously with the internal swaging of the first head portion of the torsion tube.

13. The method of claim 9, wherein the inserting the torsion tube in the side bracket occurs prior to the internal swaging of the first head portion.

14. The method of claim 9, wherein the annular protrusion formed in the first head portion of the torsion tube axially secures a spacer and the side bracket against the pivot linkage, and wherein the spacer surrounds the first head portion in a circumferential direction.

15. The method of claim 9, further comprising:

placing a spacer on the torsion tube and located between the pivot linkage and a first side of the side bracket, wherein the spacer surrounds the torsion tube in a circumferential direction; and placing a washer having an inner diameter greater than an outer diameter of the torsion tube on the torsion tube and located on a second side of the side bracket opposite to the first side of the side bracket, wherein the annular protrusion of the torsion tube axially locks the washer, the side bracket and the spacer against the pivot linkage.

16. A method of manufacturing a vehicle seat frame assembly, comprising:

inserting a first head portion of a torsion tube through a second generally cylindrical aperture in a side bracket and through a first generally cylindrical aperture in a pivot linkage, wherein the at least one side bracket is configured to be coupled to a floor bracket via the pivot linkage, wherein the torsion tube comprises a shank portion between the first head portion and a second head portion;

placing a spacer on the torsion tube and located between the pivot linkage and a first side of the side bracket;

placing a washer on the torsion tube, wherein the washer has an inner diameter greater than an outer diameter of the torsion tube and the washer is located on a second side of the side bracket opposite to the first side of the side bracket; and internally swaging the first head portion of the torsion tube radially outwardly such that an annular protrusion extending from an outer surface of the torsion tube is formed, wherein the first head portion of the torsion tube is expanded so as to have an enlarged constant inner diameter that spans an entire length of the second generally cylindrical aperture of the side bracket, wherein the annular protrusion has an outer diameter that is larger than outer diameters of the torsion tube extending from both sides of the annular protrusion in an axial direction of the torsion tube, wherein the annular protrusion of the torsion tube axially locks the washer, the side bracket and the spacer against the pivot linkage, and wherein an outer diameter of the torsion tube spanning an entire length between the side bracket and the pivot linkage is smaller than the aperture diameter of the second generally cylindrical aperture.

17. The method of claim 16, further comprising:

internally swaging the second head portion on the torsion tube radially outwardly, wherein the internal swaging of the second head portion on the torsion tube is performed simultaneously with the internal swaging of the first head portion of the torsion tube.

18. The method of claim 1, further comprising placing a spacer on the torsion tube and located between the pivot linkage and the side bracket, wherein the spacer surrounds the torsion tube in a circumferential direction.

* * * * *